United States Patent [19]

Downey

[11] Patent Number: 4,536,170

[45] Date of Patent: Aug. 20, 1985

[54] ELASTOMERIC SHEAR SHAFT COUPLING

[75] Inventor: Holmes A. Downey, Simpsonville, S.C.

[73] Assignee: Reliance Electric Company, Greenville, S.C.

[21] Appl. No.: 613,820

[22] Filed: May 25, 1984

[51] Int. Cl.³ .............................................. F16D 3/58
[52] U.S. Cl. ...................................... 464/80; 464/182
[58] Field of Search ............................. 464/80, 182

[56] References Cited

U.S. PATENT DOCUMENTS

| | | | |
|---|---|---|---|
| 2,648,958 | 8/1953 | Schlotmann | 464/80 |
| 3,020,737 | 2/1962 | Firth | 464/80 |
| 3,068,665 | 12/1962 | Firth | 464/182 X |
| 3,095,714 | 7/1963 | Schlotmann | 464/182 X |
| 3,385,080 | 5/1968 | Sorenson | 464/80 X |
| 3,468,138 | 9/1968 | Downey | 464/182 |
| 3,531,949 | 10/1968 | Downey | 464/182 X |
| 3,605,440 | 9/1971 | Firth | 464/80 |
| 3,727,429 | 4/1973 | Downey | 464/80 |
| 3,747,366 | 7/1973 | Ruggen et al. | 464/80 |

*Primary Examiner*—Stephen Marcus
*Assistant Examiner*—Leo J. Peters
*Attorney, Agent, or Firm*—Marmaduke A. Hobbs

[57] ABSTRACT

An elastomeric shear shaft coupling is disclosed for connecting two rotatable shafts in end-to-end relationship. The coupling includes hubs for mounting on the opposed ends of the shafts and a flexible element extending between the opposed hubs. Clamping members and suitable fasteners are used to secure the element to the hubs for transmitting the torque developed by the driving shaft to the driven shaft. The flexible element has a bead of harder material than the body of the element, disposed within or at the margins of the element in the locus of clamping, and is reinforced with a matrix of plies or layers of a suitable fabric material.

14 Claims, 6 Drawing Figures

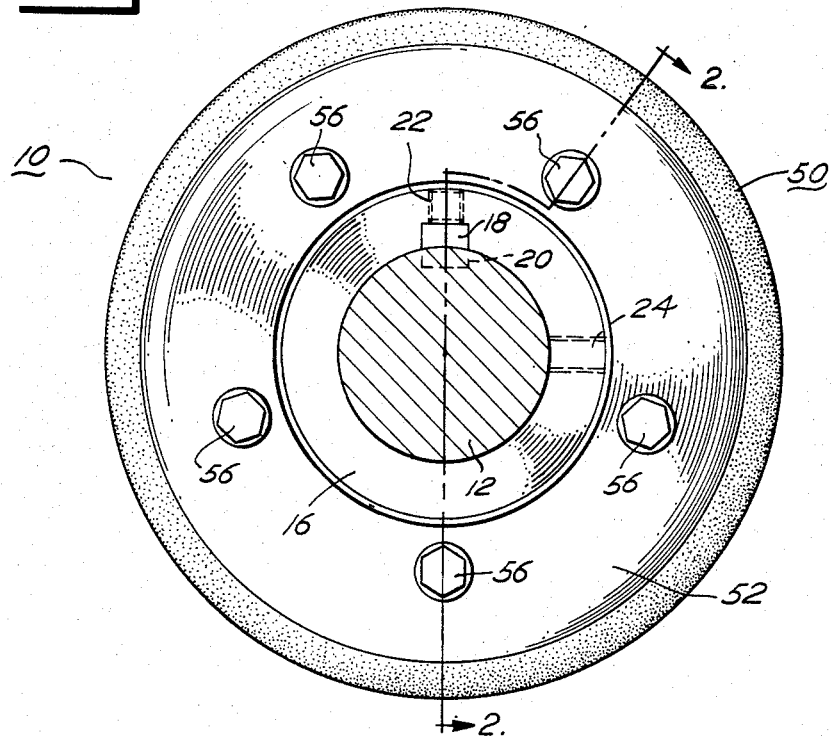
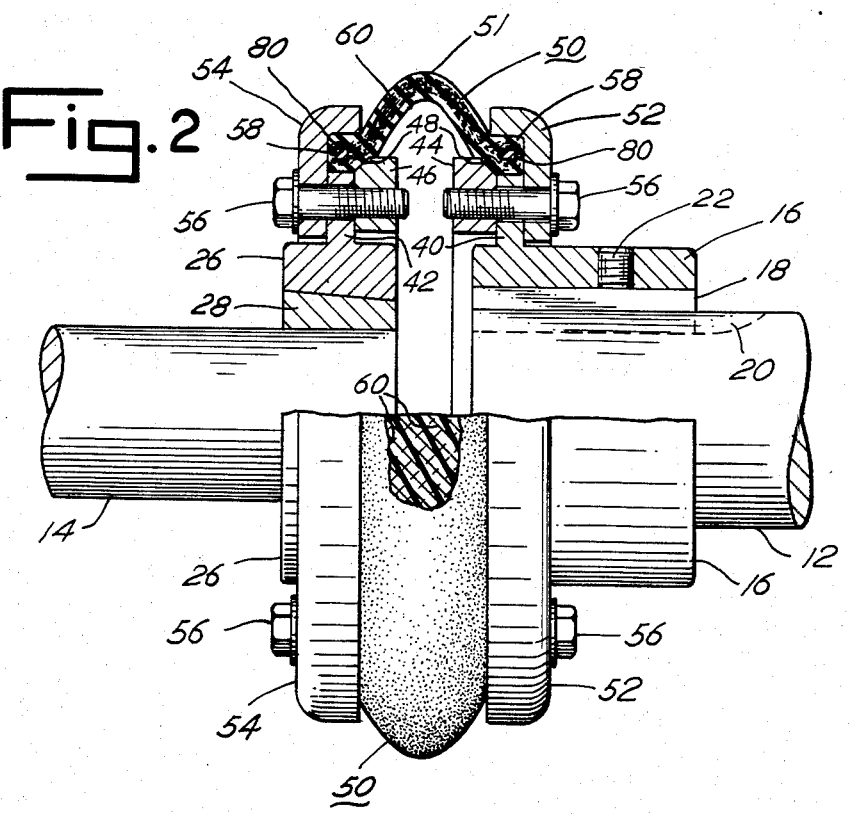

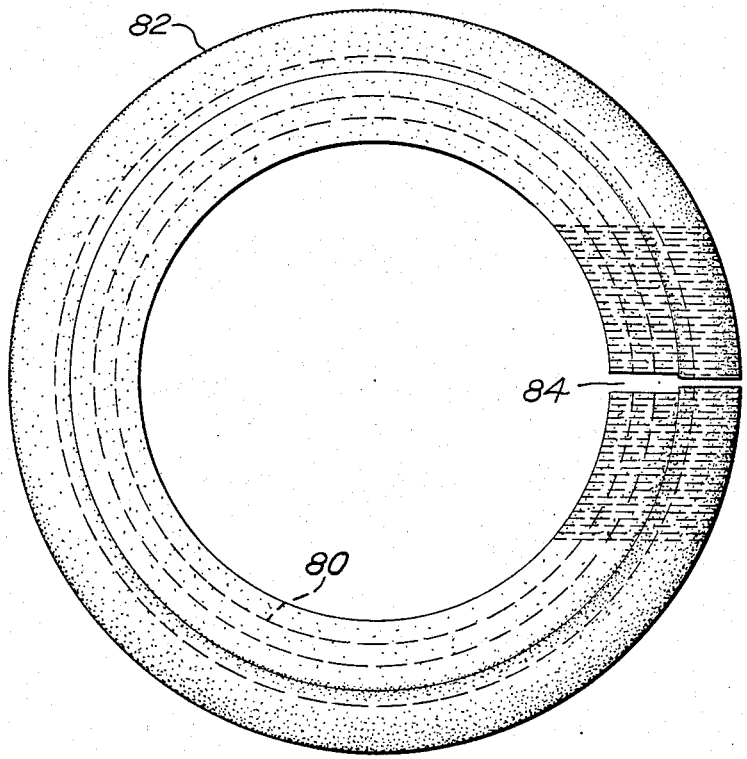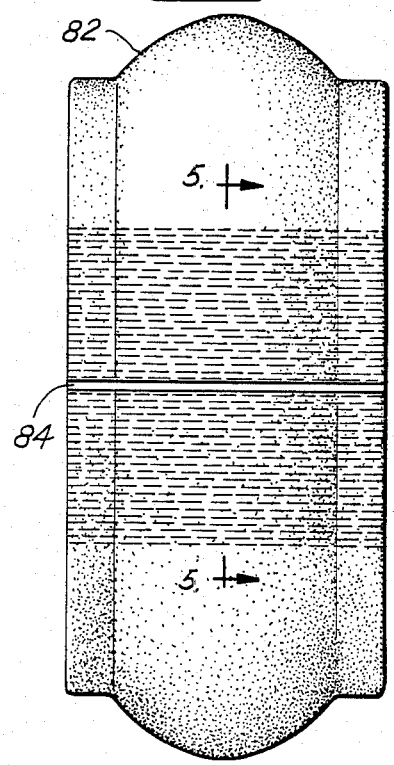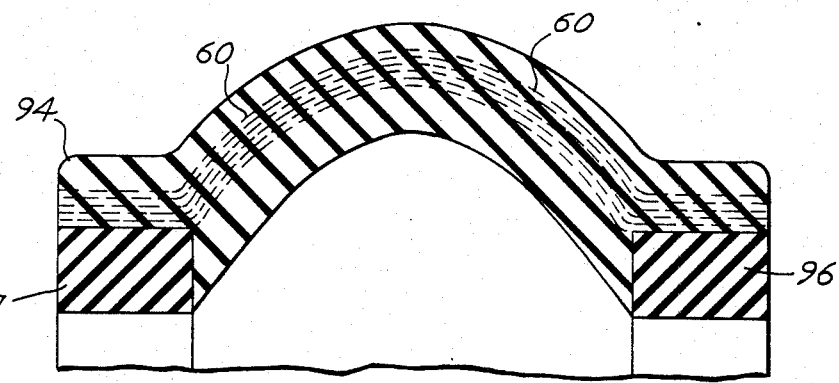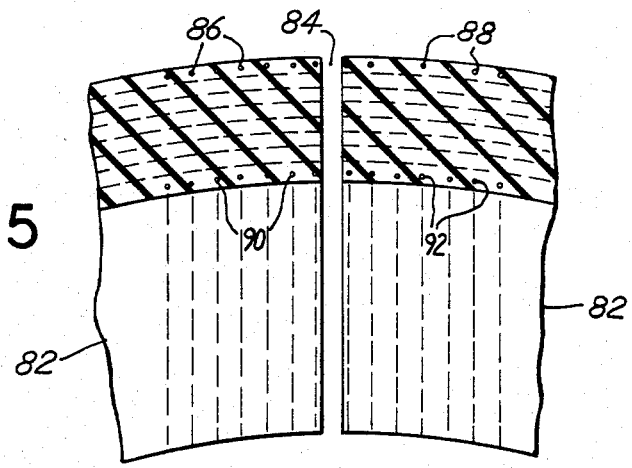

ELASTOMERIC SHEAR SHAFT COUPLING

BACKGROUND OF THE INVENTION

Flexible couplings are often used to connect two aligned, rotatable shafts for transmitting power from the driving shaft to the driven shaft. In general, the couplings have two similar halves, each mounted on the opposed ends of the respective shafts, and are connected by a flexible element of rubber or other elastomeric material. The flexible element transmits the torque developed by the driving shaft to the driven shaft and also permits the coupling to accommodate slight amounts of angular and/or parallel misalignment of the shafts, and also end float, as manifested by the shafts during operation. Thus, the connecting element must be sufficiently flexible to tolerate slight variances from perfect shaft alignment, yet sufficiently rigid to effectively transmit power. Due to its function in the coupling, the flexible element is subjected to a high degree of stress, and thus is subject to failure through tearing or other separations. Such failures are not uncommon; thus, many flexible couplings have been designed with a split, flexible element secured by external clamp members so that a failed element may be replaced without dismantling the entire coupling. The clamp members are merely removed, the element spread open at the slit and placed in position around the coupling, and the clamp members are then replaced.

During operation of the machinery on which the coupling is mounted, centrifugal force, produced by the rotating coupling assembly, tends to force the flexible element into a prabolic shape. This places extreme stress on the element, especially at the locus of clamping. In addition, during start-up operations or where severe shock loads, such as frequent reversals, must be handled by the coupling, even greater stress may be placed on the flexible element due to the high levels of torque generated. Flexible coupling elements are often reinforced with layers of fabric or cord interspersed in the elastomeric material. This practice adds strength to the coupling element; however if, improperly manufactured or bonded. The layers are subject to separation, with consequent failure of the element.

SUMMARY OF THE INVENTION

It is, therefore, one of the principal objects of the present invention to provide an elastomeric shear shaft coupling for connecting and transmitting torque from a driving to a driven rotatable shaft which provides effective torque transmission through an improved and strengthened flexible element, which may be split or circumferentially continuous.

Another object of the present invention is to prolong the effective life of the split flexible element by reinforcing the element at the slit, and throughout the body of both types of elements, with plies oriented within a defined range relative to the axis of rotation.

A further object of the present invention is to minimize and effectively distribute the stress forces inherent in flexible coupling applications throughout the flexible element by providing an element composed of both hard and soft elastomeric material, arranged to provide the necessary reactive force between the elastomer and the metal without exceeding the critical strain value of the elastomer.

A still further object of the present invention is to provide a flexible element for the coupling assembly which has a generally parabolic shape when at rest and during rotation, thereby minimizing stress at the locus of clamping.

These and other objects are attained by the present invention, which relates to a flexible coupling for connecting opposed rotatable shafts having annular coupling hubs secured to the opposed ends of the shafts, and a generally circular element of elastomeric material extending between the hubs, the element having laterally extending right and left margins for contacting the hubs. The margins have a bead therein of elastomeric material that has a higher durometer value than that forming the body of the element. Clamping means are provided for holding the margins in place against the hubs, and suitable fastening means are used to secure the clamping means together, thereby securing the flexible element. The element may be reinforced with cords or plies of a suitable fabric material, and is normally formed in the general shape of a parabola to minimize the reactive force of the coupling introduced into rotating systems, in comparison with other section shape possibilities.

Additional objects and advantages of the present invention will become apparent from the following detailed description, with reference to the accompanying drawings.

BRIEF DESCRIPTION OF THE DRAWINGS

FIG. 1 is a side elevational view of the flexible coupling embodying the present invention.

FIG. 2 is a partial cross-sectional view of the flexible coupling shown in the preceding figure, with a portion of the flexible element broken away to illustrate the orientation and arrangement of the reinforcing material, the section being taken on line 2—2 of FIG. 1;

FIG. 3 is a side elevational view of a split flexible element, shown here apart from its installed position and illustrating the reinforcement adjacent the slit;

FIG. 4 is an end elevational view of the flexible element shown in the preceding figure, further illustrating the reinforcement adjacent the slit;

FIG. 5 is an enlarged, fragmentary cross-sectional view of the reinforced ends of the flexible element adjacent the slit, the section being taken on line 5—5 of FIG. 4; and FIG. 6 is a partial, cross-sectional view of a modified form of the flexible element.

DETAILED DESCRIPTION OF THE PREFERRED EMBODIMENT

Referring more specifically to the drawings, and to FIG. 1 in particular, numeral 10 designates generally the flexible coupling embodying the present invention. The coupling is shown connecting two rotatable shafts 12 and 14, with shaft 12, for example, being the driving shaft and shaft 14 being the driven shaft. The connected shafts may be of equal size, or, as shown in FIG. 2, the shafts may be of different diameters. Ideally, the two shafts will be in precise axial alignment; however, this is often not the case, and the shafts may exhibit slight amounts of angular and/or parallel misalignment or end float. The present flexible coupling compensates for any of these misalignments, through the flexing of the connecting element, enabling the coupling to effectively transmit the torque developed by the driving shaft 12 to the driven shaft 14. For convenience of description herein, the flexible element will be referred to as being composed of rubber; however, this is intended to include both natural and synthetic rubber, as well as other suitable elastomeric materials.

The present flexible coupling may include either of two general types of coupling hubs, both of which are illustrated in FIG. 2. On the right side, as viewed in the drawing, mounted on shaft 12 is a bored-to-size coupling hub 16. Hub 16 is bored to the approximate size of the shaft and secured thereon with a key 18 which is received in a corresponding keyway 20. The hub is further secured by one or more set screws, one being shown at numeral 22 over the key 18 and another being inserted through threaded hole 24. On the opposite or left shaft, as viewed in FIG. 2, is a tapered hub 26 with a relatively large tapered bore therethrough for receiving shaft 14. The tapered hub is secured to the end of shaft 14 with a split contractible bushing 28 having an outer circumferential surface that is oppositely tapered relative to the tapered bore of hub 26. As the connecting screws (not shown) of bushing 28 are tightened, the tapered surfaces are drawn together and interact to secure the hub on the shaft. Either type of hub may be used with either shaft, the selection being dependent on the type and size of the shaft itself.

Both types of hubs have radially extending flanges 40 and 42, respectively, for hubs 16 and 26, and each flange has a plurality of unthreaded, generally circular bores therethrough for receiving the fastening means as detailed below. The radial extension of the flanges is such that the peripheral surfaces thereof have the same diameters, regardless of the type or size of hub. Disposed adjacent the inner side of the flanges are internal clamp rings 44 and 46 for the right and left sides, respectively, each having threaded bores in axial alignment with the bores in the flanges. The outermost corners of the internal rings have angular surfaces 48 for contacting the flexible element, the angles being defined within a range of from thirty to seventy degress, which approximates the angle of the inner surface of the flexible element at the points of contact therewith. A flexible element 50, having a body portion 51 and laterally extending right and left margins 58, and used for connecting and transmitting torque between the opposed hubs and, thereby, the shafts, is disposed against the peripheral surfaces of the flanges and the angular surfaces 48 of the internal clamp rings. The flexible element is secured in this position by external clamp rings 52 and 54 for the right and left sides, respectively, the external rings also having generally circular unthreaded bores therethrough in axial alignment with the bores in the flanges. Suitable fastening means, such as screws or bolts 56, are inserted through the unthreaded bores in the external rings and the flanges, and then threaded into the threaded bores in the internal clamp rings, thereby securing the flexible element in place.

The flexible element is composed mainly of a relatively soft rubber or other suitable elastomer, and may either be split, as shown in FIGS. 3 through 5, or it may be circumferentially continuous, i.e. unsplit, as shown in FIG. 1. In either case, the flexible element is formed in the general shape of a parabola and is mathematically defined by the general formula $y = A(x^2)$, where y equals the height of the parabola and the values x(plus and minus), are associated with a coordinate graph and correspond to the base of the parabola. The coefficient value A is derived mathematically from other values of the design calculations for the coupling and may be changed for specific curve forms in the equation. While the couplings may vary in diameter from five inches to over thirty inches, the present invention uses a curve form with the coefficient in a narrow range of numeric definition, and the coefficient varies only slightly in value, from approximately 1.0 to 1.10. The x and y values will, of course, vary with the size of the coupling. As noted earlier, the centrifugal force generated by the rotating components tends to force any flexible element into essentially a shape approximating a parabolic curve. The use of a parabolic shape for the present flexible element minimizes the reactive force of the coupling introduced into rotating systems when compared with other section shape possibilities, as the parabolic shape is pre-formed and maintained throughout operation of the machinery.

The present flexible element is reinforced throughout with plies or layers 60 of cord or fabric, normally of a synthetic fiber material, that are interspersed within the body 51 and margins 58 of the element. As shown in FIGS. 2 and 6, the plies are concentrated around the centroid, which is the approximate center of mass or imaginary center line, of the parabolic shaped elements, and extend into and throughout the margins, thereby strengthening the element in these critical areas and minimizing dynamic axial thrust reactions. A portion of the flexible element in FIG. 2 has been cut away to illustrate the orientation of the plies 60. To maximize strength, stability, and torque transmission capabilities, the plies are oriented within a range of from thirty degrees to sixty-five degrees relative to a plane normal to the axis of rotation of the coupling. The plies are spaced within the element for efficient element structure and stability, the spacing being limited to no more than four times the diameter of the cord or ply as molded. In addition, the plies are alternating in application; that is, each succeeding ply or layer is disposed across the preceding layer, laid at approximately ninety degrees to each other and within the 30° through 65° limit, thereby forming an efficient and substantially reinforced matrix within the element.

Embedded within the outer edges or margins 58 of the flexible element 50 in the locus of clamping, are beads 80 of an elastomeric material, the beads being enclosed by the matrix of reinforcing plies. The material used for the beads is harder, with a higher durometer value than the surrounding rubber, the bead being sized proportionally relative to the total clamping area. For example, the material used for the body 51 of the element may have a durometer value of $65 \pm 5$ Shore A, while the bead may have a value of 95A. As shown in FIG. 2, the clamping area is substantially surrounded, due to the angular surfaces 48 of the internal clamp rings which follow the inner wall of the element, combined with the generally right angle or L-shape of the external clamp rings. As bolts 56 are tightened, the internal clamp ring exerts pressure outwardly and angularly against the element, and the external clamp ring exerts pressure axially, radially, and angularly inward against the element. The force thus generated by the clamp rings is transmitted through the softer rubber areas of the flexible element to the harder rubber bead and the layers or plies of reinforcing material, where it is radiated outwardly therefrom throughout the element matrix. The clamping effectiveness between the rubber element and the metal components must not exceed the rubber strain value of approximately twenty to twenty-five percent. For the present flexible element, the frictional force necessary to transmit the element shear force to the metal structure is determined by the compression modulus of the element structure in the area of clamping, and the combination herein of relatively incompressible cords or plies and both hard and soft rubber segments, provides the reactive forces necessary for transmission of the rubber to metal force without exceeding the strain value.

FIGS. 3 through 5 illustrate a flexible element 82 similar to element 50, except for a slit 84 which completely severs the element. This permits easy replacement of a failed element without necessitating the removal of one or both hubs. The external clamp rings are merely removed or loosened, and the element 82 is spread open at the slit and seated against the flanges 40 and 42. The areas adjacent the slit are those most likely to fail, since the slit tends to concentrate the lines of force at the two adjacent ends. Thus, surface reinforcement of the external side of the flexible element 82 at the split ends is accomplished by superficially embedded reinforcing strands 86 and 88. These strands or cords are coated with an elastomeric material so that no raw cords are exposed. The internal side of the element is also reinforced with strands or cords 90 and 92, which are also coated so that no raw cords are exposed. These strands, 86, 88, 90, and 92, cover the faces of the split ends and the surfaces of the elements extending away from the split ends for a circumferential distance determined to be at least the axial length of the flexible element. The surface-reinforcing strands are also oriented generally parallel with the rotational axis of the coupling. A similar surface reinforcement is disclosed in my U.S. Pat. No. 3,468,138, issued on Sept. 23, 1969, for a Coupling With Reinforced Flexible Element.

An alternative embodiment of the flexible element is illustrated in FIG. 6. This flexible element 94 is reinforced with layers of plies 60, the plies being concentrated around the centroid of the element, similar to the previously disclosed embodiment, and extending into the right or left margins around the rubber beads 96 and 97. The element also has the generally parabolic shape, as defined by the equation $y=A(x^2)$. Element 94 has proportionately larger areas of relatively harder rubber beads 96 and 97. The beads 96 and 97 provide a relatively firm surface for engaging the peripheral surfaces of the flanges, and contribute to the effective development of clamping pressure in the marginal areas. The effects and the performance of element 94 are similar to those of elements 50 and 82, in that the combination of hard and soft rubber and relatively incompressible cord provides the necessary reactive forces for transmission of torque from the rubber to the metal without exceeding the rubber strain value of 20-25%.

In the use and operation of the elastomeric shear shaft coupling embodying the present invention, suitable hubs, such as hubs 16 and 26, are secured to the opposed ends of the aligned shafts 12 and 14 to be connected. The reinforced flexible element 50, 82, or 94 is then seated against the angular surfaces 48 of the internal clamp rings 44 and 46 and the outermost surfaces of flanges 40 and 42. The external clamp rings 52 and 54 are then used to secure the element in place, inserting screws or bolts 56 through unthreaded bores in the external clamp rings and the flanges, whereupon they are threadedly received in threaded bores in the internal clamp rings. Clamping effectiveness is superior to that of prior couplings due to the combination of hard rubber beads 80 or 96 and 97, the relatively firm cords or plies, and the softer rubber which comprises the remainder of the element. The coupling can accomodate end float and angular and/or parallel misalignment of the shafts within certain parameters, while effectively transmitting the torque developed by the driving shaft to the driven shaft through the flexible element.

While an embodiment of an elastomeric shear shaft coupling and modifications thereof have been shown and described in detail herein, various other changes and modifications may be made without departing from the scope of the present invention.

I claim:

1. An elastomeric shear shaft coupling for connecting two rotatable shafts in end-to-end relationship, said coupling comprising:
    a. annular coupling hubs for mounting on the adjacent ends of the shafts;
    b. a generally circular flexible element of elastomeric material being of a substantially parabolic cross-sectional shape and extending between said hubs and having laterally extending right and left margins for contacting said hubs;
    c. a bead of elastormeric material, with a higher durometer value than that of the body of said element, disposed within each of said margins;
    d. a plurality of fabric plies interspersed within said elastomeric material for reinforcing said element, said plies being concentrated near the centroid of said element and terminating at each side adjacent said beads;
    e. clamping means for retaining said margins in place against said hubs; and
    f. fastening means for securing said clamping means and said element to said hubs.

2. An elastomeric shear shaft coupling as defined in claim 1 in which said hubs include radially extending annular flanges having upper surfaces for receiving said margins and a plurality of generally circular bores therethrough.

3. An elastomeric shear shaft coupling as defined in claim 2 in which said clamping means includes:
    a. internal clamp rings disposed adjacent the inner surfaces of said flanges and having outwardly facing angular surfaces thereon for receiving said element, and a plurality of threaded bores therein for receiving said fastening means; and
    b. external, generally L-shaped clamp rings disposed adjacent the outer surface of said element and having a plurality of bores therein for receiving said fastening means for securing said external ring to said internal ring.

4. An elastomeric shear shaft coupling as defined in claim 3 in which said element has a parabolic shape being defined by the formula $y=A(x^2)$, where y equals the height of the parabola, x equals positive and negative points on a coordinate graph, and A is a coefficient which varies between 1.0 and 1.10.

5. An elastomeric shear shaft coupling as defined in claim 1 in which said element has a parabolic shape defined by the formula $y=A(x^2)$, where y equals the height of the parabola, x equals positive and negative points on a coordinate graph, and A is a coefficient which varies between 1.0 and 1.10.

6. An elastormeric shear shaft coupling as defined in claim 5 in which said clamping means includes internal and external clamp rings, said internal rings having outwardly facing angular surfaces for receiving said parabolic shaped element, and said angular surfaces have a pitch defined within the range of thirty to seventy degrees.

7. An elastomeric shear shaft coupling as defined in claim 6 in which said parabolic shaped element includes reinforcing fabric plies oriented within a range of thirty to sixty-five degrees relative to a plane normal to the axis of rotation of the coupling and alternating in application.

8. An elastomeric shear shaft coupling as defined in claim 1 in which said flexible element has a slit extending axially and radially therethrough and cord means disposed within said element and at the edges of said slit for reinforcing said element.

9. An elastormeric shear shaft coupling as defined in claim 1 in which said plies are alternately disposed at thirty to sixty-five degrees relative to a plane normal to the axis of rotation of the coupling, and at approximately ninety degrees to each other.

10. A flexible element for an elastomeric shear shaft coupling having opposed coupling hubs and clamping members for retaining said element in operative position, said flexible element comprising:

a. a body portion of substantially parabolic cross-sectional shape composed of elastomeric material and having laterally extending right and left margins b. a bead disposed in said margins and composed of elastomeric material having a higher durometer value than said body portion; and c. reinforcing plies of fabric material disposed within said flexible element in spaced layers, concentrated near the centroid of said body portion and terminating on each side in the proximity of said beads.

11. A flexible element as defined in claim 10 in which said plies are oriented at thirty to sixty-five degrees relative to a plane normal to the axis of rotation of the coupling, with each of said layers being disposed parallel with and approximately ninety degrees from the adjacent layer.

12. A flexible element as defined in claim 10 in which said beads are enclosed within said margins.

13. A flexible element as defined in claim 10 in which said beads form the inner surfaces of said margins.

14. A flexible element as defined in claim 10 in which said element has a slit extending axially and radially therethrough with reinforcing plies at the edges of said slit.

* * * * *